United States Patent
Abboud et al.

(10) Patent No.: US 12,282,437 B2
(45) Date of Patent: Apr. 22, 2025

(54) DUAL-MODE LOCAL GATEWAY FOR LEGACY PERIPHERAL DEVICES

(71) Applicant: AMADEUS S.A.S., Biot (FR)

(72) Inventors: Edmond Abboud, Antibes (FR); Beranger Chanoir, Peymeinade (FR); Sylvain Fualdes, Biot (FR)

(73) Assignee: AMADEUS S.A.S., Biot (FR)

( * ) Notice: Subject to any disclaimer, the term of this patent is extended or adjusted under 35 U.S.C. 154(b) by 62 days.

(21) Appl. No.: 18/474,801

(22) Filed: Sep. 26, 2023

(65) Prior Publication Data
US 2025/0103516 A1   Mar. 27, 2025

(51) Int. Cl.
*G06F 13/10* (2006.01)
*G06F 9/54* (2006.01)

(52) U.S. Cl.
CPC .......... *G06F 13/102* (2013.01); *G06F 9/545* (2013.01)

(58) Field of Classification Search
None
See application file for complete search history.

(56) References Cited

U.S. PATENT DOCUMENTS 10,990,773 B1 *   4/2021   Herbel ............... H04W 4/80

\* cited by examiner

*Primary Examiner* — Scott C Sun
(74) *Attorney, Agent, or Firm* — Perry + Currier Inc.

(57) ABSTRACT

A method includes: obtaining, at a gateway, configuration data defining communication parameters for a peripheral device; receiving, at the gateway, a command to activate an inspection operating mode and deactivate a relay operating mode; in response to activating the inspection operating mode: establishing, with a local enterprise application, a first connection according to the communication parameters for the peripheral device; establishing a second connection with the peripheral device according to the communication parameters; for data received via each one of the first and second connections, (i) logging the data, and (ii) transmitting the data over the other of the first and second connections.

15 Claims, 5 Drawing Sheets

DUAL-MODE LOCAL GATEWAY FOR LEGACY PERIPHERAL DEVICES

FIELD

The specification relates generally to interconnecting peripheral devices with server-based services, and specifically to a dual-mode local gateway for legacy peripheral devices.

BACKGROUND

Various facilities, such as hotels, contain peripheral devices such as keycard encoders, telephone systems, point of sale (PoS) devices, and the like. An on-premise computing device, for example executing a property management system (PMS) application, may be used to connect to and manage such peripheral devices, enabling integrated management of various aspects of the facility's operation, including those involving the peripheral devices.

Shifting PMS applications, or other enterprise applications applicable to other facilities that also contain peripheral devices, to a remote host (e.g., generally referred to as cloud applications) may relieve the facility itself of managing various aspects of the configuration and management of the enterprise application. However, enabling the cloud-based enterprise application to control or otherwise communicate with local peripheral devices may involve providing the cloud-based application with configuration settings indicating what communication protocols, message formats, and the like, are employed by the peripheral devices. Such configuration settings may be difficult to generate, as documentation may be unavailable or incomplete for some peripheral devices.

SUMMARY

Examples disclosed herein provide a method, comprising: obtaining, at a gateway, configuration data defining communication parameters for a peripheral device; receiving, at the gateway, a command to activate an inspection operating mode and deactivate a relay operating mode; in response to activating the inspection operating mode: establishing, with a local enterprise application, a first connection according to the communication parameters for the peripheral device; establishing a second connection with the peripheral device according to the communication parameters; and for data received via each one of the first and second connections, (i) logging the data, and (ii) transmitting the data over the other of the first and second connections.

Additional examples disclosed herein provide a gateway computing device, comprising: a communications interface; and a processor configured to: obtain configuration data defining communication parameters for a peripheral device; receive, via the communications interface, a command to activate an inspection operating mode and deactivate a relay operating mode; in response to activating the inspection operating mode: establish, with a local enterprise application, a first connection according to the communication parameters for the peripheral device; establish a second connection with the peripheral device according to the communication parameters; for data received via each one of the first and second connections, (i) log the data, and (ii) transmit the data via the communications interface over the other of the first and second connections.

Further examples disclosed herein provide a non-transitory computer readable medium storing a plurality of computer-readable instructions executable by a processor of a computing device to: obtain configuration data defining communication parameters for a peripheral device; receive, via a communications interface, a command to activate an inspection operating mode and deactivate a relay operating mode; in response to activating the inspection operating mode: establish, with a local enterprise application, a first connection according to the communication parameters for the peripheral device; establish a second connection with the peripheral device according to the communication parameters; for data received via each one of the first and second connections, (i) log the data, and (ii) transmit the data via the communications interface over the other of the first and second connections.

BRIEF DESCRIPTIONS OF THE DRAWINGS

Embodiments are described with reference to the following figures.

DETAILED DESCRIPTION

Figure 1:
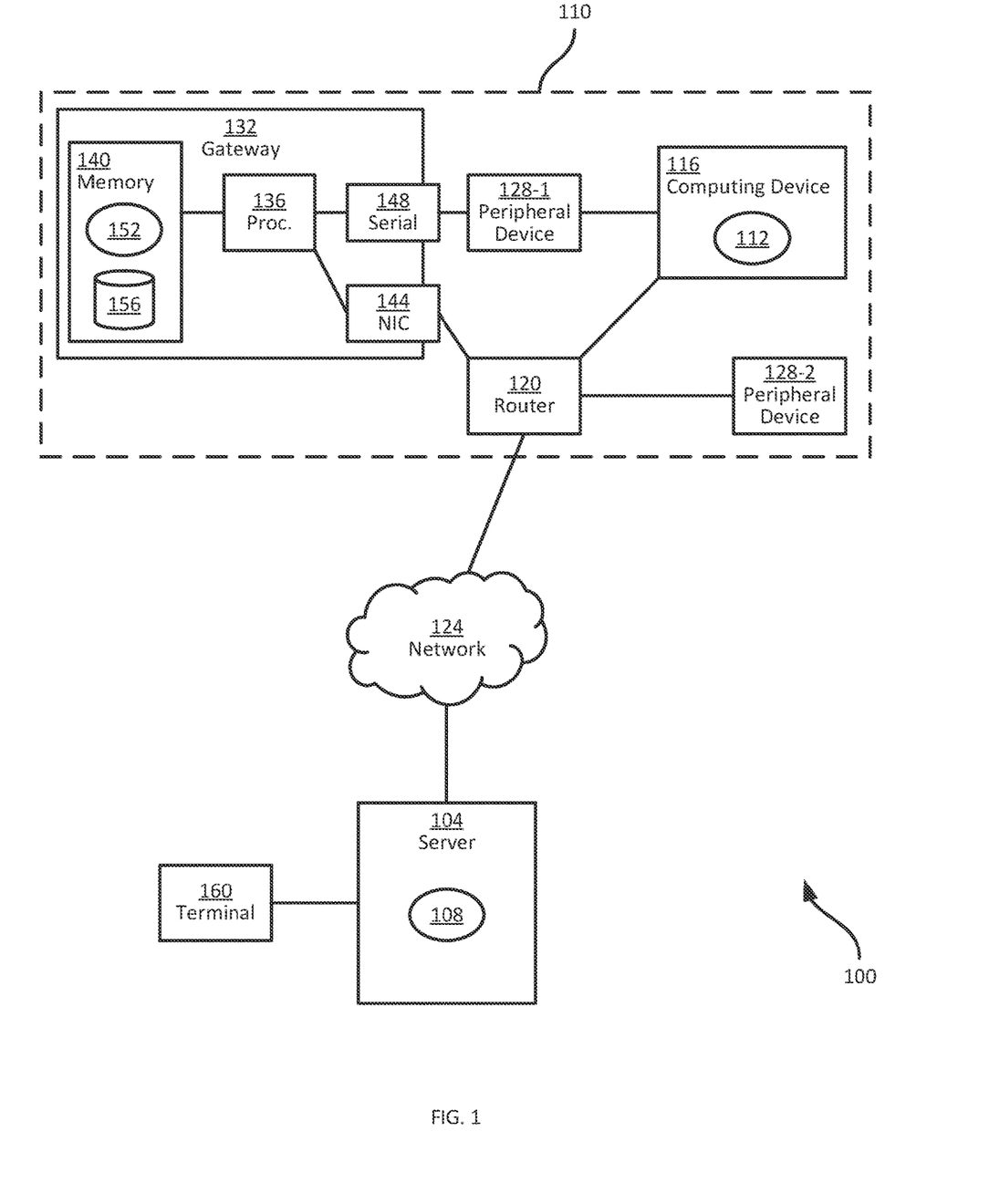
FIG. 1 is a diagram of a system for developing and/or deploying a cloud-based enterprise application.

FIG. 1 illustrates a system 100 for developing and/or deploying a cloud-based enterprise application, such as a PMS operated by a hotel. As will be apparent to those skilled in the art, in the context of hotel operations, a PMS can include various components to track room reservations, check-in and check-out events, cleaning and other maintenance, staff scheduling, and the like. The system 100 can also implement a cloud-based (e.g., software-as-a-service or SaaS) PMS for facilities other than hotels, such as manufacturing facilities, warehousing facilities, or the like.

The system 100 can include, for example, a server 104 (which can be implemented in a distributed format, or as a discrete computing device) executing an enterprise application 108, such as the above-mentioned PMS. The server 104 is generally remote from hotel premises 110 (or another suitable facility). Prior to deployment of the cloud-based enterprise application 108, the functions implemented by the application 108, and/or similar functions, may be implemented by a local enterprise application 112, e.g., executed by a local computing device 116. The application 112 may also be referred to as a legacy enterprise application (e.g., a legacy PMS). The local computing device 116 can be any suitable device, such as a desktop computer, laptop computer, or the like, with one or more output devices such as a display, input devices such as a keyboard and mouse, and the like.

The computing device 116, via execution of the application 112, maintains reservations, staffing schedules, payment data, and the like, and/or any other functions involved in the type of enterprise on premises 110. Migrating the functionality of the application 112 to the server 104 (e.g., to replicate or otherwise replace the application 112 with the application 108) may be appealing for scalability, outsourced maintenance, or the like. Once the application 112 has been replaced with the application 108, the computing device 116 and/or other computing devices on premises 110 can connect with the server 104, e.g., via an on-premises local area network implemented by a router 120 and a wide area network 124 (e.g., including the Internet). The computing device 116 can operate as a client of the application 108, e.g., displaying information received from the server 104 and providing user input data to the server 104. The computing device 116 need not, however, implement business logic, data storage or the like in connection with the enterprise application 108. The computing device 116 can interact with the application 108 at the server 104, for example, via a web browser or other suitable local application.

The migration of certain functionality from the application 112 to the application 108, prior to decommissioning of the application 112, may include controlling and communicating with physical components on premises 110 that are difficult or impossible to relocate to the cloud. Examples of such elements include peripheral devices 128. Example peripheral devices 128-1 and 128-2 are shown in FIG. 1, and can include devices or collections of devices such as keycard encoders, telephone systems (e.g., a private branch exchange (PBX)), point-of-sale (PoS) devices, and the like. The peripheral devices 128, which can also be referred to as legacy devices, interact with physical components on premises 110, such as keycards, room telephones, and the like, and therefore must generally remain on premises 110 even in systems where the controlling enterprise application 108 has been implemented in the cloud.

Certain peripheral devices 128 may not be capable of Internet Protocol (IP) based communication, and therefore cannot communicate directly with the server 104. For example, the peripheral device 128-1 (e.g., a keycard encoder) may communicate via a serial data connection, such as an RS232 port or the like. Other peripheral devices 128 may be capable of IP-based communication, but may be prevented from communicating directly with computing devices outside the premises 110 (such as the server 104) by a firewall, e.g., implemented by the router 120.

When PMS or other suitable functionality is deployed locally, e.g., via the enterprise application 112 at the computing device 116, the peripheral devices 128 can be controlled by the computing device 116. For example, the peripheral device 128-1 can be connected to the computing device 116 via a serial cable, and the peripheral device 128-2 can be connected to the computing device 116 via a local-area network, behind the firewall implemented by the router 120. To migrate to the cloud-based application 108, the system 100 can also include a gateway appliance 132, such as a further computing device on premises 110 and connected to the router 120 or other internal networking infrastructure. In other examples, the functionality of the gateway 132 can also be implemented in software on the computing device 116.

The gateway 132 is configured, in general, to establish connections with the peripheral devices 128, e.g., via suitable interface hardware discussed further below, and to relay data between the peripheral devices 128 and the server 104. The gateway 132 need not process data received from the peripheral devices 128, e.g., to apply business logic thereto. Instead, the gateway 132 can receive such data, encapsulate the data according to an application programming interface (API) implemented by the server 104, and transmit the encapsulated data to the server 104. Conversely, data from the server 104 destined for the peripheral devices 128 need only be de-encapsulated at the gateway 132 and sent to the peripheral devices 128. The server 104 itself (via execution of the application 108) is configured to handle any protocol translation, business logic application, and the like, in connection with the peripheral devices 128. An example implementation of the gateway 132 is described in U.S. Pat. No. 11,503,138.

As will be apparent to those skilled in the art, enabling the application 108 to communicate with and control the peripheral devices 128 involves configuring the application 108 to interpret data received from the peripheral devices 128, and convert data generated at the server 104 into formats, syntaxes, and the like, compatible with the peripheral devices 128. However, certain peripheral devices 128 may lack documentation, and the protocols, data formats, and the like, that a given peripheral device 128 uses. Although the application 112 is configured to communicate with the peripheral devices 128, the application 112 may include proprietary code, e.g., in binary format. Configuring the application 108 to communicate with the peripheral devices 128 (via the gateway 132) may therefore require some degree of reverse-engineering by operators of the server 104.

In previous systems, the success of such reverse-engineering may be assessed only when the application 108 is deployed to the premises 110, such that the peripheral devices 128 begin communicating with the server 104 via the gateway 132. The application 112 may be decommissioned at that time. Errors or omissions in the configuration of the application 108, such as a type of message from the peripheral device 128-1 that the application 108 has not been configured to handle, may result in downtime on premises 110, as well as additional development work at the server 104. In some instances, the deployment of the application 108 may even need to be rolled back, and the legacy enterprise application 112 re-activated to permit additional development.

To mitigate the potential impacts of incomplete or erroneous configuration at the application 108 for communicating with the peripheral devices 128, the gateway 132 is configurable to operate in two distinct modes. The gateway 132 is therefore also referred to as a dual-mode gateway. In a relay operating mode, the gateway 132 operates as mentioned above, encapsulating data from the peripheral devices 128 for transmission to the server 104, and receiving data from the server 104 for forwarding to the peripheral devices 128. In the relay operating mode, in other words, the application 112 is decommissioned, and control of the peripheral devices 128 is provided by the server 104.

The gateway 132 also implements an inspection operating mode, in which the server 104 does not exert control over, or communicate with, the peripheral devices 128. Instead, in the inspection mode, the gateway 132 relays data between the peripheral devices 128 and the application 112 at the computing device 116. The application 112 thus remains active, and despite the presence of the gateway 132, the premises 110 are not migrated to the cloud-based application 108. The gateway 132, in the inspection mode, transparently forwards any data from the peripheral devices 128 to the device 116, and vice versa. The gateway 132 also logs any forwarded data. The gateway 132 therefore enables the collection of a library of messages between the application 112 and the peripheral devices 128, which can be used to reverse-engineer functionality for the application 108 to communicate with the peripheral devices 128. Such logging functionality may reduce the likelihood of incorrect or incomplete configuration of the application 108. Further, in the event that incorrect or incomplete configuration of the application 108 is discovered, the gateway 132 can be returned to the inspection mode, bringing the application 112 back online with minimal disruptions to operations at the premises 110.

Certain internal components of the gateway 132 are shown in FIG. 1. In the illustrated example, the gateway 132 includes at least one processor 136, such as a central processing unit (CPU), graphics processing unit (GPU), or the like. The processor 136 is interconnected with a memory 140, implemented as a suitable non-transitory computer-readable medium, such as a combination of volatile and non-volatile memory components (e.g., any one or more of Random Access Memory (RAM), read only memory (ROM), Electrically Erasable Programmable Read Only Memory (EEPROM), flash memory, magnetic computer storage, and the like). The processor 136 and the memory 140 are generally comprised of one or more integrated circuits (ICs).

The processor 136 is also interconnected with a communications interface 144, which enables the gateway 132 to communicate with other computing devices such as the server 104 and the peripheral device 128-2, e.g., via the router 120 and (in the case of the server 104 or other devices outside the premises 110) the network 124. The communications interface 144, in this example, includes a network interface controller (NIC) configured to enable IP-based communications. As will be apparent, the interface 144 can include one or more Ethernet ports, wireless radio assemblies, or the like.

The gateway 132 can also include a local communications interface 148, such as a serial controller, e.g., including one or more RS-232 ports or other suitable serial data transmission ports. The interface 148 is configured for direct connection to one or more peripheral devices 128, such as the peripheral device 128-1 in this example. Although the peripheral device 128-1 is shown connected to both the interface 148 and the computing device 116 (e.g., which also includes a serial port or other suitable interface) in FIG. 1, the peripheral device 128-1 may include only one connector, and may therefore be connected to only one of the gateway 132 and the computing device 116 at a given time.

The memory 140 stores a plurality of computer-readable programming instructions, executable by the processor 136. The instructions stored in the memory 140 include a gateway application 152, which may also be referred to as a firmware application of the gateway 132. The firmware application 152 is executable by the processor 136, configuring the gateway 132 to operate in one of the above-mentioned modes. In the relay mode, the application 152 configures the gateway 132 to relay data between the peripheral devices 128 and the server 104. In the inspection mode, the application 152 configures the gateway 132 to log and transparently forward data between the peripheral devices 128 and the computing device 116 for processing via execution of the application 112. The data logged in the inspection mode can be stored, for example, in a repository 156, for concurrent or subsequent access by operator(s) of the server 104. For example, a terminal 160 such as a desktop computer or the like can be connected with the server 104, enabling an operator to retrieve data from the repository 156 for storage and/or analysis at the server 104.

Figure 2:
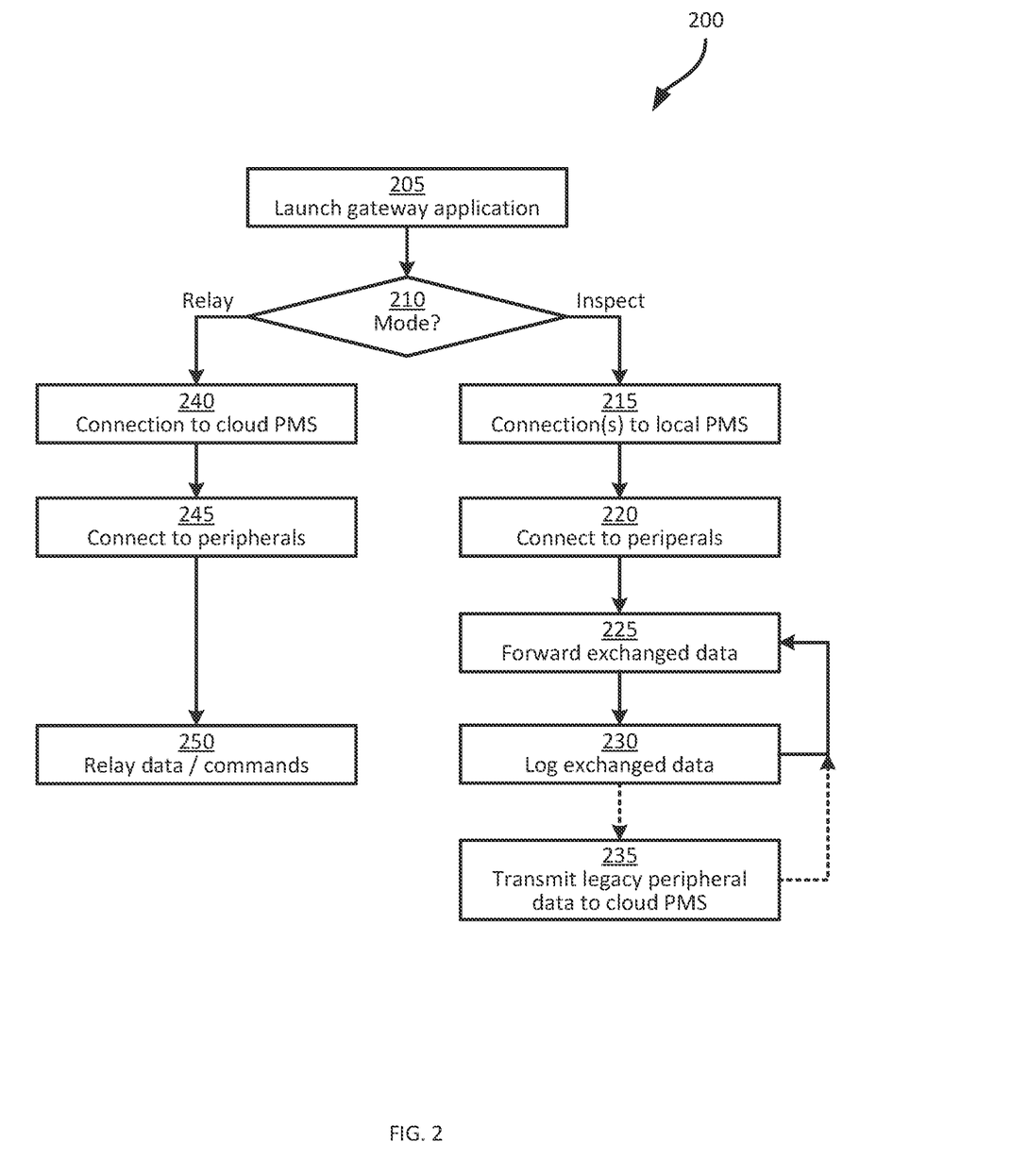
FIG. 2 is a flowchart of a method of operating a dual-mode gateway for development and deployment of a cloud-based enterprise application.

Turning to FIG. 2, a method 200 of operating a dual-mode gateway for developing and deploying a cloud-based enterprise application is illustrated. The method 200 is described below in conjunction with its example performance by the gateway 132.

At block 205, the gateway 132 is configured to launch the application 152, e.g., in response to a command from an operator on premises 110, or automatically (e.g., on a schedule, in response to the gateway 132 powering on, or the like). At block 210, the gateway 132 is configured to determine whether to operate in the relay mode or the inspection mode. For example, the gateway 132 can receive commands from the terminal 160 via the server 104, or via a local device (e.g., an input device such as a keyboard, a hardware mode switch integrated with the gateway 132, or the like) specifying an active operating mode. The active mode specified in such a command can be stored in a register or the like, and the determination at block 210 can therefore include determining which mode is indicated as the currently active mode as a result of a command.

When the determination at block 210 indicates that the inspection mode is active (and that the relay mode is therefore inactive), the gateway 132 proceeds to block 215. As will be apparent to those skilled in the art, prior to deployment of the application 108 for the premises 110 (e.g., prior to decommissioning of the application 112), the gateway 132 may be operated in the inspection mode to gather sample messages for use in configuring the application 108. Once the gateway 132 has operated in the inspection mode for a period of time sufficient to configure the application 108, the gateway 132 may be restarted in the relay mode, for example.

At block 215, in response to a command to operate in the inspection mode, the gateway 132 is configured to establish a distinct connection with the computing device 116 for each peripheral device 128. The connection(s) established with the computing device 116 at block 215 are established according to configuration data corresponding to the peripheral devices 128. The gateway 132 can be provisioned with such configuration data from the server 104, or via direct data transfer locally (e.g., via a USB key, local input device, or the like).

To establish connections at block 215, therefore, the gateway 132 retrieves previously stored configuration data, e.g., from the memory 140. The configuration data may define, for peripheral devices 128 connected to serial ports such as those implemented by the interface 148, connection parameters such as baud rate, signal timing, parity bit settings, and the like. The gateway 132 can therefore be configured to establish a connection with the computing device 116 according to the connection parameters for the peripheral device 128-1. In other words, the gateway 132 appears to the computing device 116 as a serial-connected peripheral device 128.

The configuration data for peripheral devices 128 that typically connect to the application 112 via IP networks, such as the peripheral device 128-2, can include connection parameters defining socket settings, such as IP addresses (if addresses are not assigned dynamically, e.g., by the router 120), port numbers, socket type indicators (e.g., Transmission Control Protocol (TCP) or User Datagram Protocol (UDP)), or the like. The configuration data can also indicate whether the peripheral device 128-2 operates as a client (e.g., initiating a connection with the computing device 116) or a server (e.g., listening for a connection from the computing device 116). The gateway 132 can therefore be configured to establish a connection with the computing device 116 according to configuration data corresponding to the peripheral device 128-2. For example, the gateway 132 can request a connection with the computing device 116 via the interface 144, using the port number and socket type as indicated in the configuration data. In some examples, the application 112 may also be reconfigured to listen for the IP address and port number used by the gateway 132, rather than that used by the peripheral device 128-2.

The above process is repeated for each peripheral device 128 represented in the configuration data stored at the gateway 132. If the gateway 132 is unable to establish one or more of the connections (e.g., if the computing device 116 is powered off, a serial cable is unplugged, or the like), the gateway 132 is configured not to proceed to block 220 for the corresponding peripheral devices 128. The gateway 132 does not generate responses to data received from the peripheral devices 128, and therefore if a connection with the computing device 116 that corresponds to a particular peripheral device 128 is not established, the peripheral device 128 may behave unexpectedly if connected only to the gateway 132.

At block 220, following the establishment of a connection with the computing device 116 for each peripheral device 128 represented in configuration data at the gateway 132, the gateway 132 is configured to establish respective connections with the peripheral devices 128. The connections established at block 220 are also set up according to the configuration data noted above. Thus, for example, the peripheral device 128-1 can be connected to a serial port of the interface 148 (with the computing device 116 being connected to another serial port of the interface 148) using the connection parameters discussed above. The gateway 132 can further be configured to listen for a connection request from the peripheral device 128-2 on a predetermined port number specified by the configuration data.

Figure 3:
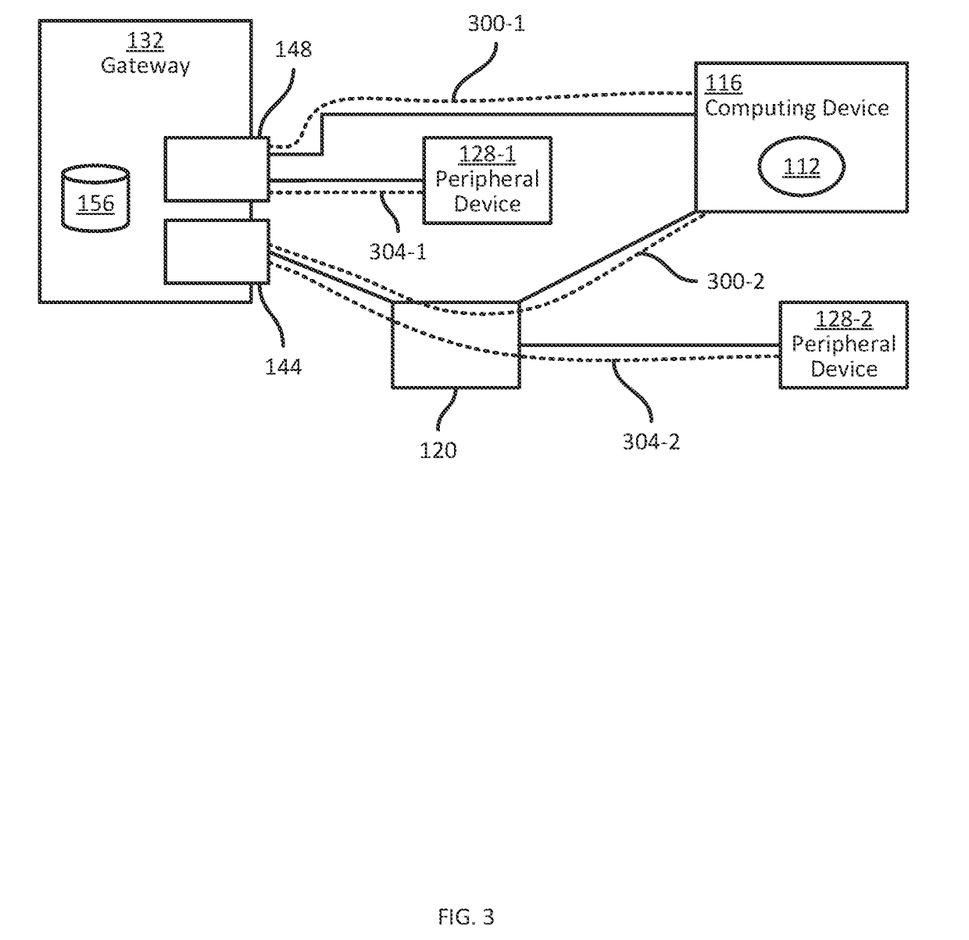
FIG. 3 is a diagram illustrating an example performance of blocks 215 and 220 of the method of FIG. 2.

As will now be apparent, via the performance of blocks 215 and 220, the gateway 132 appears to the computing device 116 as each of the peripheral devices 128, and to each of the peripheral devices 128, as the computing device 116. Referring to FIG. 3, a diagram illustrating the connections established at blocks 215 and 220 is shown. The gateway 132, at block 215, establishes a serial connection 300-1 with the computing device 116 from the interface 148 (via a serial cable, for example), and an IP connection 300-2 with the computing device 116 via the interface 144. At block 220, the gateway 132 establishes a serial connection 304-1 with the peripheral device 128-1 (via another port of the interface 148), and an IP connection 304-2 with the peripheral device 128-2.

Returning to FIG. 2, at block 225, the gateway 132 is configured to forward any data from each peripheral device 128 to the computing device 116, and any data from the computing device 116 to the peripheral device 128 corresponding to the connection over which such data is received. The gateway 132, in other words, transparently passes data between the computing device 116 and the peripheral devices 128, without modification to the payloads of such data. As will be apparent, in the case of data to and from the peripheral device 128-2, header data may be modified to re-address data received at the gateway 132 from the peripheral device 128-2 towards the computing device 116.

Any data forwarded at block 225 is also, at block 230, logged to the repository 156 for subsequent analysis. Optionally, at block 235, data sent from a peripheral device 128 to the computing device 116 that has been forwarded and logged can also be relayed to the server 104, for processing by the application 108 (e.g., for testing purposes).

Figure 4:
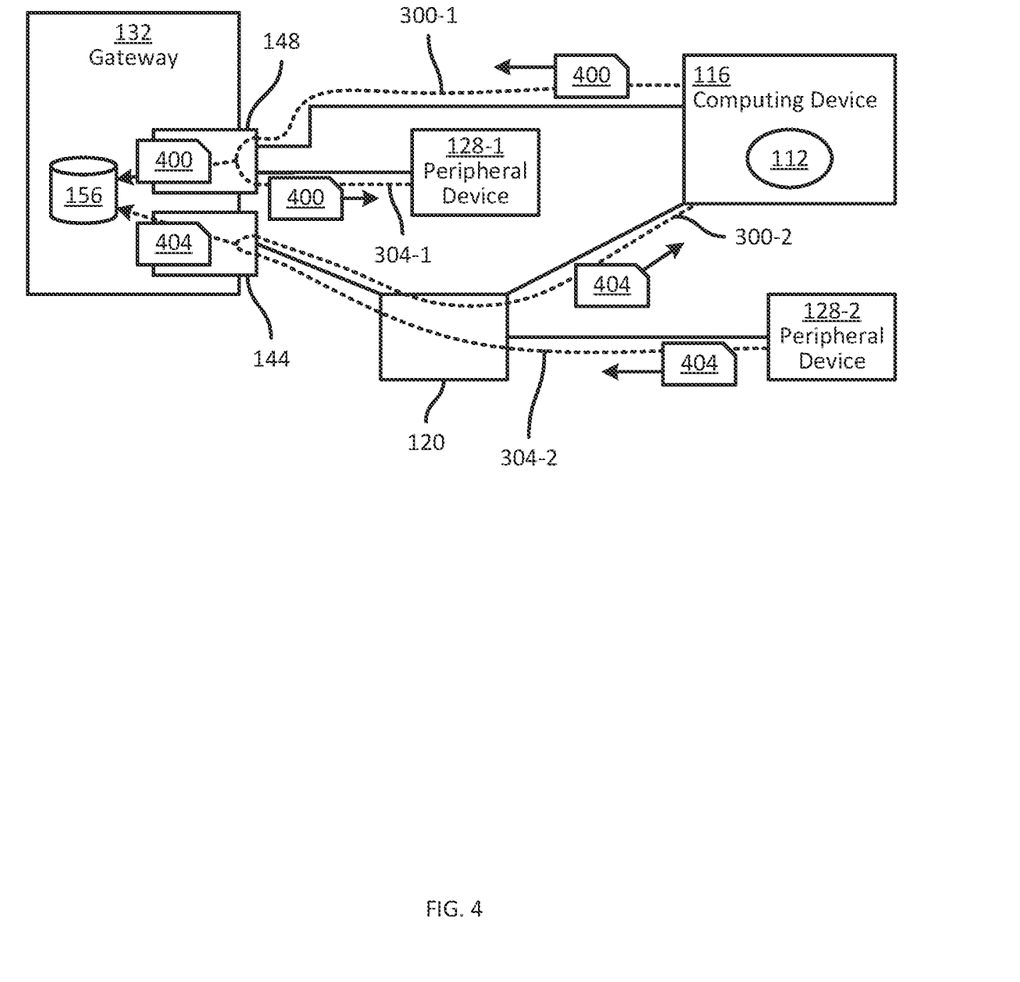
FIG. 4 is a diagram illustrating an example performance of blocks 225 and 230 of the method of FIG. 2.

Turning to FIG. 4 example performances of block 225 and 230 are illustrated. As shown in FIG. 4, data 400 sent by the computing device 116 over the connection 300-1 (and thus intended for the peripheral device 128-1) is logged in the repository 156, and forwarded to the peripheral device 128-1. The data 400 is not reformatted or translated. For example, the signal received at one port of the interface 148 can be mirrored at the other port of the interface 148. Data 404 sent by the peripheral device 128-2 over the connection 304-2 (and thus intended for the computing device 116) is also logged in the repository 156, and forwarding to the computing device 116. Aside from the modification of header data to address the data 404 to the computing device 116, the data 404 also remains unchanged by forwarding.

As will be apparent, operation of the gateway 132 in the inspection mode enables the continued operation of the legacy enterprise application 112 while gathering data for use in configuring the cloud-based enterprise application 108. When the application 108 has been configured, the gateway 132 can be switched to the relay mode, e.g., by a further operator command, activation of a hardware switch, or the like. That is, a further performance of the method 200 can be initiated, with the determination at block 210 leading to block 240 rather than block 215.

At block 240, instead of establishing distinct connections to the computing device 116 for each of the peripheral devices 128, the gateway 132 is configured to establish one connection with the server 104, over which data to and from all of the peripheral devices will be exchanged. The connection established at block 240 can further be encrypted, e.g., using a connection key received from the server 104 during a registration and configuration stage prior to block 205.

At block 245, the gateway 132 is configured to establish connections with each of the peripheral devices 128, as described earlier at block 220. At block 250, the gateway 132 is configured to relay data and/or commands between the server 104 and the peripheral devices 128. In contrast to the forwarding of data at block 225, however, the relayed information at block 250 is processed for delivery to the server 104. For example, messages from any of the peripheral devices 128 can be encapsulated in messages defining API calls to the server 104 prior to transmission to the server 104. That is, while the payload of such messages may remain unchanged, the messages are embedded within the payload of encapsulating messages, with the same encapsulation applied to messages from any peripheral device 128.

Figure 5:
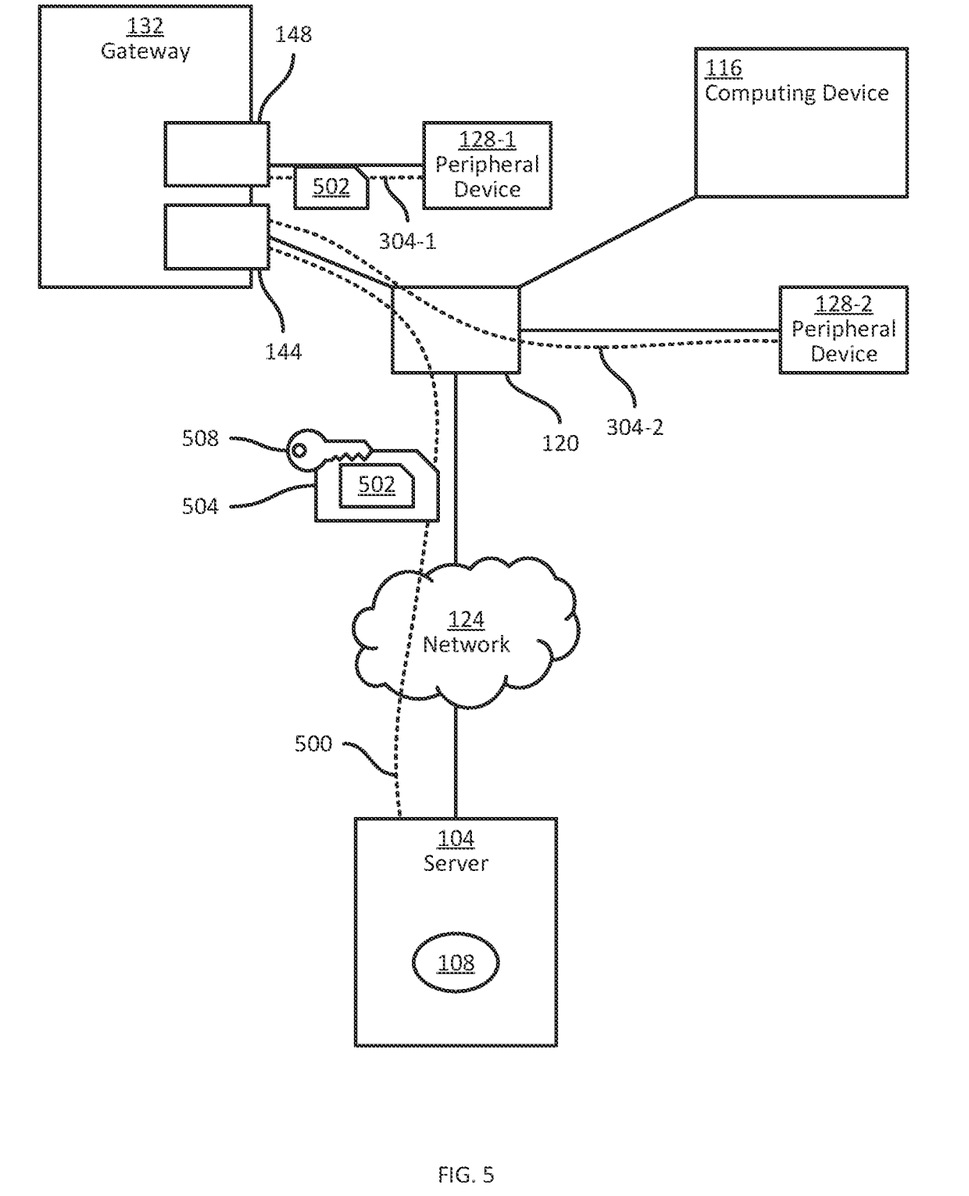
FIG. 5 is a diagram illustrating an example performance of blocks 240 to 250 of the method of FIG. 2.

Turning to FIG. 5, example operation of the gateway 132 in the relay mode is shown. In particular, in addition to the previously mentioned connections 304-1 and 304-2, the gateway 132 establishes a connection 500 with the server 104. Data 502 received from the peripheral device 128-1, for example, is encapsulated in an API message 504 or the like, and encrypted with a connection key 508 prior to transmission to the server 104. Likewise, messages received from the server 104 and addressed to a peripheral device 128 are decrypted and de-encapsulated before transmission over the relevant connection 304.

The two operating modes of the gateway 132 therefore enable the collection of data for use in developing the application 108, and facilitate the cutover from the legacy application 112 to the cloud-based application 108. Further, in the event of difficulties with the migration, the gateway 132 can be readily reverted to the inspection mode, and the legacy enterprise application 112 can continue operation.

Those skilled in the art will appreciate that in some embodiments, the functionality implemented by the processor 136 via execution of the application 152 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method, comprising:
    obtaining, at a gateway, configuration data defining communication parameters for a peripheral device;
    receiving, at the gateway, a command to activate an inspection operating mode and deactivate a relay operating mode;
    in response to activating the inspection operating mode:
        establishing, with a local enterprise application, a first connection according to the communication parameters for the peripheral device;
        establishing a second connection with the peripheral device according to the communication parameters; and
        for data received via each one of the first and second connections, (i) logging the data, and (ii) transmitting the data over the other of the first and second connections.

2. The method of claim 1, wherein the configuration data defines respective sets of connection parameters for a plurality of peripheral devices; and wherein the method further comprises, in response to activating the inspection operating mode:
    establishing distinct first connections with the local enterprise application for each set of connection parameters; and
    establishing distinct second connections with the peripheral devices.

3. The method of claim 1, further comprising:
    receiving, at the gateway, a command to activate the relay operating mode and deactivate the inspection operating mode;
    in response to activating the relay operating mode:
        establishing a third connection with a remote enterprise application; and
        for data received via each one of the second connections, transmitting the data over the third connection.

4. The method of claim 3, further comprising: terminating the first connection with the local enterprise application.

5. The method of claim 3, wherein transmitting the data over the third connection includes encapsulating the data in an application programming interface call to the remote enterprise application.

6. The method of claim 5, wherein transmitting the data over the other of the first and second connections in the inspection operating mode includes mirroring the data without encapsulation.

7. The method of claim 1, wherein the gateway includes a first serial port connected with the peripheral device, and a second serial port connected with the local enterprise application; and
    wherein transmitting the data over the other of the first and second connections includes mirroring data received at one of the first and second serial ports on the other of the first and second serial ports.

8. A gateway computing device, comprising:
    a communications interface; and
    a processor configured to:
        obtain configuration data defining communication parameters for a peripheral device;
        receive, via the communications interface, a command to activate an inspection operating mode and deactivate a relay operating mode;
        in response to activating the inspection operating mode:
            establish, with a local enterprise application, a first connection according to the communication parameters for the peripheral device;
            establish a second connection with the peripheral device according to the communication parameters;
            for data received via each one of the first and second connections, (i) log the data, and (ii) transmit the data via the communications interface over the other of the first and second connections.

9. The gateway computing device of claim 8, wherein the configuration data defines respective sets of connection parameters for a plurality of peripheral devices; and
    wherein the processor is further configured, in response to activating the inspection operating mode, to:
        establish distinct first connections with the local enterprise application for each set of connection parameters; and
        establish distinct second connections with the peripheral devices.

10. The gateway computing device of claim 8, wherein the processor is further configured to:
    receive a command to activate the relay operating mode and deactivate the inspection operating mode;
    in response to activating the relay operating mode:
        establish a third connection with a remote enterprise application; and
        for data received via each one of the second connections, transmit the data over the third connection.

11. The gateway computing device of claim 10, wherein the processor is further configured to: terminate the first connection with the local enterprise application.

12. The gateway computing device of claim 10, wherein the processor is configured to transmit the data over the third connection by encapsulating the data in an application programming interface call to the remote enterprise application.

13. The gateway computing device of claim 12, wherein the processor is configured to transmit the data over the other of the first and second connections in the inspection operating mode includes mirroring the data without encapsulation.

14. The gateway computing device of claim 8, wherein the communications interface includes a first serial port connected with the peripheral device, and a second serial port connected with the local enterprise application; and
    wherein the processor is configured to transmit the data over the other of the first and second connections by mirroring data received at one of the first and second serial ports on the other of the first and second serial ports.

15. A non-transitory computer readable medium storing a plurality of computer-readable instructions executable by a processor of a computing device to:
    obtain configuration data defining communication parameters for a peripheral device;
    receive, via a communications interface, a command to activate an inspection operating mode and deactivate a relay operating mode;
    in response to activating the inspection operating mode:
        establish, with a local enterprise application, a first connection according to the communication parameters for the peripheral device;

establish a second connection with the peripheral device according to the communication parameters;

for data received via each one of the first and second connections, (i) log the data, and (ii) transmit the data via the communications interface over the other of the first and second connections.

\* \* \* \* \*